United States Patent [19]
Prittie

[11] 4,166,968
[45] Sep. 4, 1979

[54] ELECTRICALLY ISOLATED BRUSH HOLDER

[75] Inventor: Robert N. Prittie, Aurora, Ohio

[73] Assignee: Lear Siegler, Inc., Santa Monica, Calif.

[21] Appl. No.: 815,504

[22] Filed: Jul. 14, 1977

[51] Int. Cl.² .......................................... H02K 13/00
[52] U.S. Cl. .................................................. 310/239
[58] Field of Search ............... 310/239, 240, 241, 242, 310/245, 246, 247, 220, 221, 222, 223, 71, 43, 45

[56] References Cited

U.S. PATENT DOCUMENTS

| | | | |
|---|---|---|---|
| 2,683,826 | 7/1954 | Staak | 310/239 |
| 2,753,477 | 7/1956 | Yahn | 310/239 |
| 3,003,074 | 10/1961 | Finsterwalder | 310/240 |
| 3,106,656 | 10/1963 | Merriam | 310/239 |
| 3,141,985 | 7/1964 | Martin | 310/239 |
| 3,159,763 | 12/1964 | Colvill | 310/239 |
| 3,176,177 | 3/1965 | Huston | 310/247 |
| 3,628,075 | 12/1971 | Dafler | 310/239 |
| 3,654,504 | 4/1972 | Susdorf | 310/246 |
| 3,735,172 | 5/1973 | Battaglia | 310/239 |
| 3,739,323 | 6/1973 | Spors | 310/71 |

*Primary Examiner*—R. Skudy
*Attorney, Agent, or Firm*—Pearne, Gordon, Sessions, McCoy & Granger

[57] ABSTRACT

An improvement in dynamo electric machines is disclosed in which the brush holder is electrically isolated from the brush pigtail terminal junction. The member which supports the junction connecting the brush pigtail and the lead from the stator includes an insulator which electrically isolates the junction from the brush holder. The insulator eliminates the relatively low impedance electrical path between the brush terminal and the commutator through the brush holder, preventing damaging arcing between the commutator and the brush holders.

8 Claims, 7 Drawing Figures

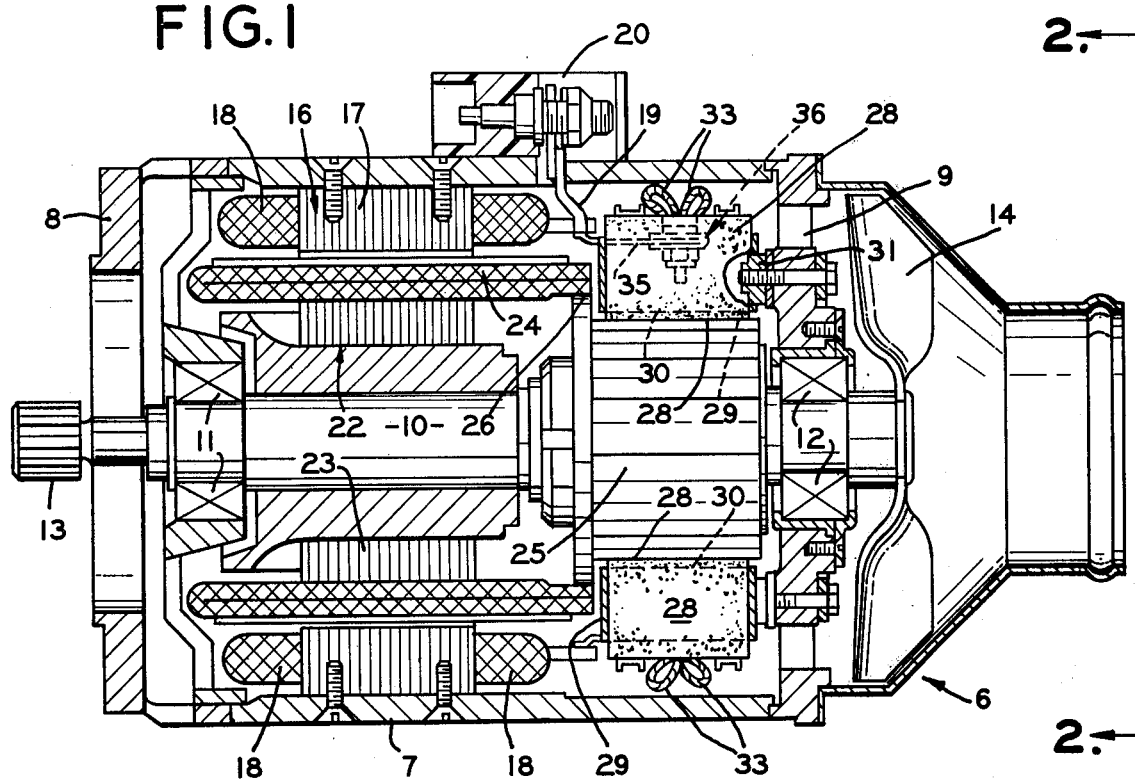
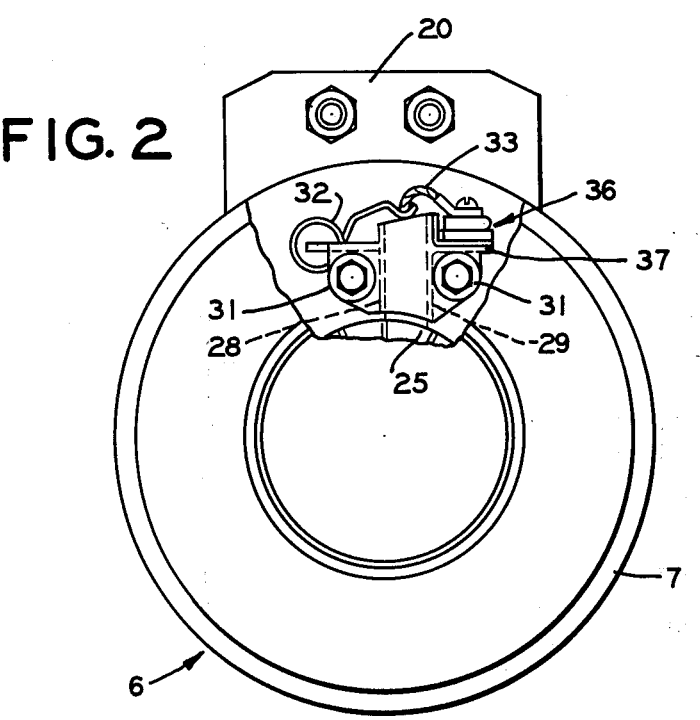

ELECTRICALLY ISOLATED BRUSH HOLDER

BACKGROUND OF THE INVENTION

This invention relates to dynamoelectric machines having commutators and brushes, and especially to direct current electric motors and generators.

In such machines, the passage of very large currents between the carbon composition brushes and the commutator results in localized heating due to the combination of resistive heating at the contact face and machine commutation. If sufficiently severe, ionization of materials may occur, allowing the creation of an electrical arc with intense heating that will melt materials such as the stainless steel used in the brush holders and copper alloys used in the commutators. It is particularly important, therefore, to prevent the creation of arcing between the portions of the brush holder and the commutator.

In the conventional design of many DC motors, a flange or similar member which is a portion of the brush holder is used to support the junction between the brush pigtail and the stator lead. The brush holder is commonly formed from stainless steel or some other electrically conductive material, and the flange or other portion of the brush holder supporting the junction is similarly constructed of the electrically conductive material.

In such conventional designs, arcing can develop between the commutator and the lower edge of the holder which is in close proximity to the commutator under conditions of especially heavy current through the machine. This arcing results in severe damage to the holders, brushes, and commutator and eventual failure of the machine. For example, the brush holder may be distorted or altered in a way that prevents the spring loaded brush it holds from being urged into full contact with the commutator.

SUMMARY OF THE INVENTION

It is an object of the present invention to eliminate the damaging arcing which occurs between the brush holder and the commutator when very heavy currents pass through the brushes and to prevent this arcing without the necessity of a major redesigning of the machine components.

According to the present invention, the arcing is prevented by eliminating the direct low impedance electrical path between the brush holder and both the brush pigtail and the stator lead, which path is in parallel with the brush itself. This relatively low impedance path is eliminated in machines of conventional design by electrically isolating the brush holder from the point of connection of the brush pigtail and the stator lead or cable. By providing sufficient insulation between the junction at this connection point and the brush holder, the electrical path through the holder that is parallel to the brush itself is eliminated or such parallel paths are made of such relatively high impedance as to prevent formation of damaging arcs between the commutator and the brush holders.

BRIEF DESCRIPTION OF THE DRAWINGS

FIG. 1 is a sectional side view of a DC electric motor incorporating the improvement of the present invention.

FIG. 2 is a fragmented end view of the motor taken along line 2—2 of FIG. 1.

DETAILED DESCRIPTION OF THE PREFERRED EMBODIMENTS

Figure 3:
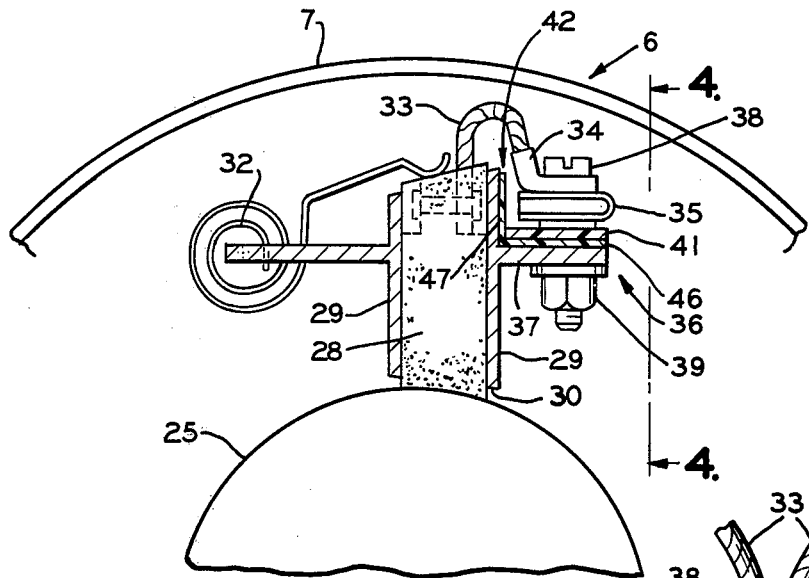
FIG. 3 is an end sectional view of the motor to a larger scale than FIG. 2 showing particularly the brush and the connection of the brush.

Referring more particularly to the drawing and initially to FIG. 1, there is shown a conventional DC electric motor 6 incorporating the improvement of the present invention. The motor 6 has an outer housing 7 including an end shield assembly 8 and a support assembly 9. A shaft 10 is centrally mounted for rotation and supported by bearing assemblies 11 and 12 adjacent to end shield assembly 8 and support assembly 9, respectively. The shaft 10 has a drive connection 13 at one end and fan 14 at the other end. Mounted within the housing 7 is a field or stator assembly 16 comprising a laminated stator core 17 supporting a plurality of windings 18. The stator windings 18 are connected to a stator winding terminal 19 through which current enters the motor 6 by suitable connections to a terminal block 20 mounted outside the housing 7.

A rotor or armature 22 is supported on the rotatable shaft. The armature 22 includes a laminated core 23 and a plurality of armature windings 24. A commutator 25 is supported on one end of the shaft 10 and connected through portions 26 to the armature windings 24. Electrical contact brushes 28 usually of a carbon composition are supported for contact with the commutator 25 in brush holders 29 which are commonly made of stainless steel or other similar material. In the embodiment shown, the motor 6 is a four-pole device having two pairs of brushes 28.

Each brush holder 29 surrounds and supports the brush 28 therein with the brush extending slightly beyond the bottom edge 30 of the holder so that the holder does not rub against the commutator 25. The brush holder 29 has a flange assembly 31 at one end for attaching the holder to the support assembly 9. Brush springs 32 along one side of the holder 29 urge the brush 28 radially inwardly to maintain contact with the commutator 25. For providing the current path to and from the brushes, each brush 28 has an attached shunt or pigtail 33 having a terminal or lug 34 at the end thereof. The pigtails 33, which are usually formed of stranded copper, make an electrical connection with the stator windings 18 through a lead 35 from the stator winding terminal 19. The junction 36, at which the pigtail terminal 34 is connected to the stator lead 35, is commonly supported on a unitary support member or flange similar to flanges 37 formed along the side of the brush holder 29 opposite the brush springs 32, and secured with means such as a screw 38 and nut 39.

With the present invention, however it has been found that the flange along the side of the brush holder 29 provides an electrical path which is parallel to the desired path through the brush 28. Specifically, current travels from the stator lead 35 through the flange and along the brush holder 29, resulting in undesirable arcing between the bottom edge 30 of the brush holder and the commutator 25. This undesired electrical path is parallel to the desired path from the stator lead 35 through the pigtail 33 and the brush 28 to the commutator 25.

Figure 5:
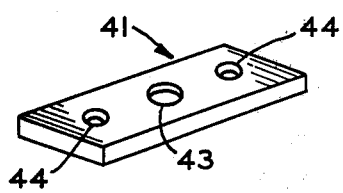
FIG. 5 is a perspective detail view of the plate insulator of FIGS. 3 and 4.
Figure 4:
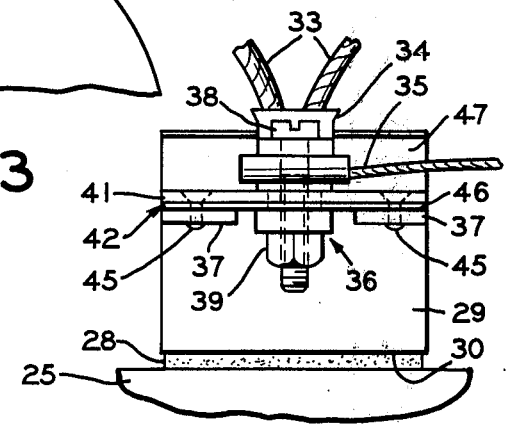
FIG. 4 is a side elevational view taken along line 4—4 of FIG. 3.

The problem of arcing resulting from this design has been eliminated by electrically isolating the junction 36 of the pigtail terminal 34 and the stator lead 35 from the brush holder as shown in FIGS. 3 and 4. According to the present invention, two spaced parallel flanges 37 are formed along the side of the brush holder 29 with a space formed therebetween, and the junction 36 is supported on a support assembly including a rigid plate insulator 41 and a thin L-shaped insulator 42 which are attached to the flanges 37. The plate insulator 41 (FIG. 5) is preferably a relatively thick piece of insulating material, such as glass laminate, having a central opening 43 and two smaller holes 44. The plate insulator is attached to the flanges 37 by rivets 45 inserted through the holes 44, with the horizontal portion 46 of the L-shaped insulator 42 sandwiched between the insulator 41 and the flanges 37. The carrying nut 39 is secured in the central opening 43, and is electrically isolated from the flanges 58 of the brush holder 29 by the plate insulator 41. The vertical portion 47 of the L-shaped insulator 42 prevents the pigtail terminal 34 from contacting the upper portion of the brush holder 29 as the screw 38 is tightened. The insulators 41 and 42 thus eliminate the electrical path through the holder 29 that is parallel with that through the brush 28, or at least make such parallel path of such relatively high impedance as to prevent the formation of damaging arcs between the commutator 25 and the edge 30 of the brush holder.

Figure 6:
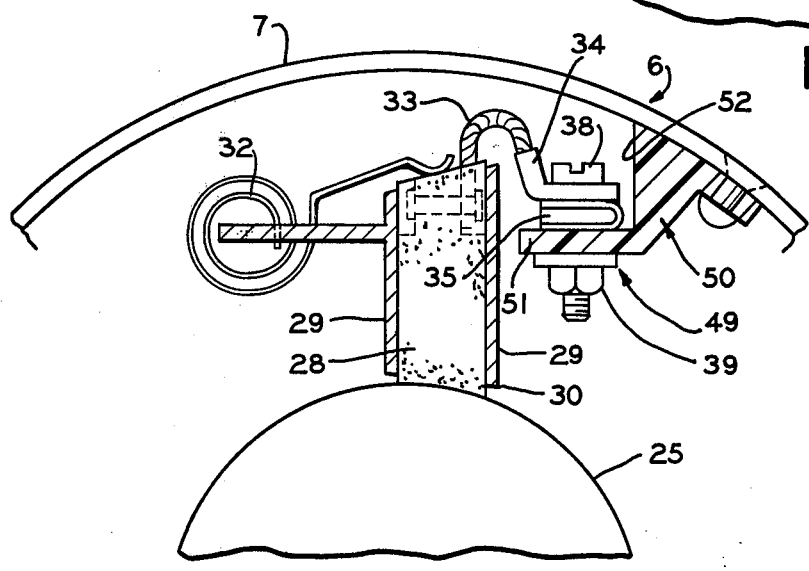
FIG. 6 is an end sectional view similar to FIG. 3 showing another embodiment of the invention.

The invention as shown in FIGS. 3 and 4 is preferred since the insulators 41 and 42 can be added to conventional brush holder designs with only slight modifications to provide two spaced flanges 37 along the side of the holder to support the insulators. Other embodiments are possible in which the terminal is electrically isolated. One such alternative embodiment is shown by junction 49 in FIG. 6, wherein the nut 39 used to attach the stator lead 35 and the pigtail 33 is supported on bracket 50 made of rigid insulating material and attached to the motor housing 7. The plate insulator is formed by the horizontal portion 51 of the bracket 50. The L-shaped insulator is not needed in this embodiment since the vertical portion 52 of the bracket 50 prevents the pigtail terminal 34 from rotating against the brush holder 29 as the screw 38 is tightened. The bracket 50 can be made of any known electrically insulating material.

Figure 7:
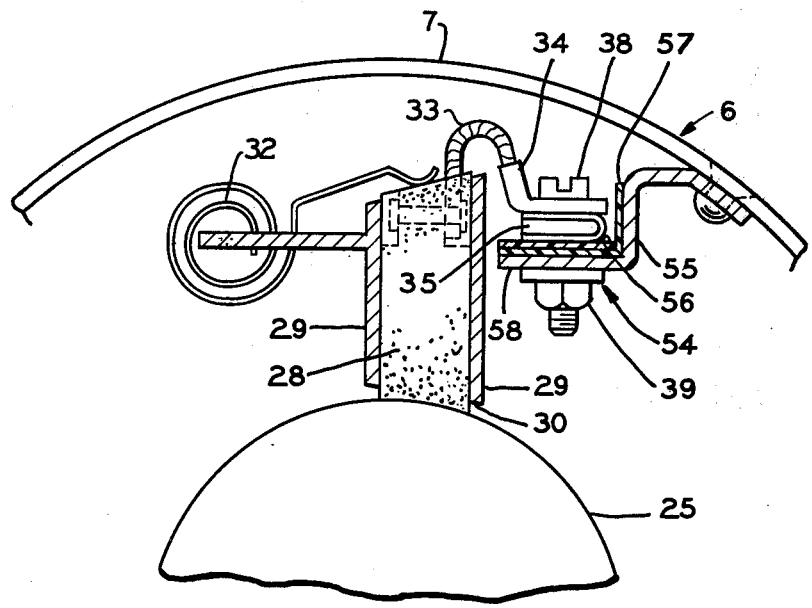
FIG. 7 is another end sectional view similar to FIGS. 3 and 6 showing another embodiment of the invention.

Alternatively, the bracket may be made of a conductive material such as steel, as illustrated by junction 54 in FIG. 7, in which a bracket 55 is attached to the motor housing 7. Since the bracket 55 is conductive, the junction 54 includes a plate insulator 56 and an L-shaped insulator 57. The horizontal portion of the bracket 55 comprises two spaced flanges 58, similar to flanges 37. The plate insulator 56 is attached to the flanges 37, similar to insulator 41. The L-shaped insulator 57 prevents contact between the pigtail terminal 34 and the conductive bracket 55, similar to insulator 42. The carrying nut 39 is mounted in a central hole in the plate insulator 56.

While the invention has been shown and described with respect to a DC electric motor, it is understood that the problem of arcing between the brush holder and the commutator and the prevention of such arcing using the present invention can be incorporated into other machines having commutators and electrical contact brushes, such as single-phase alternating current commutator motors and various commutator-type dynamoelectric machines.

Those skilled in the art will appreciate that various changes and modifications can be made in apparatus described herein without departing from the spirit and scope of the invention.

What is claimed is:

1. An improved dynamoelectric machine of the type having a housing, a rotatable commutator within the housing, a brush which contacts the commutator, an electrically conductive brush holder attached to the housing and supporting the brush, a brush pigtail connected to the brush, and a lead for connection with the pigtail at a junction, wherein the improvement comprises an assembly attached to the brush holder which supports the junction between the brush pigtail and the lead of a stator, said support assembly including a first insulator which electrically isolates the junction from the brush holder and a second insulator which electrically isolates the pigtail from the brush holder.

2. The improvement of claim 1, wherein the support assembly is mounted on a flange attached to the brush holder.

3. The improvement of claim 2, wherein the first insulator is interposed between the junction and the flange.

4. An improved dynamoelectric machine of the type having a housing, a rotatable commutator, an electrically conductive brush holder attached to the housing and supporting the brush, a brush pigtail connected to the brush, and a lead for connection with the pigtail at a junction, wherein the improvement comprises an assembly attached to the housing which supports the junction between the brush pigtail and the lead of a stator, said support assembly having a conductive portion and including a first insulator interposed between the junction and the conductive portion which electrically isolates the junction from the brush holder and a second insulator which electrically isolates the pigtail from the conductive portion.

5. A dynamoelectric machine, which comprises:
an outer housing;
a rotatable shaft within the housing;
a stator attached to the housing;
an armature attached to the shaft;
a commutator mounted on the shaft and connected to the armature;
a conductive brush holder attached to the housing;
a brush supported in the brush holder;
a brush pigtail electrically connected to the brush;
a stator lead connected to the stator and adaptable for connection to the brush pigtail at a junction; and
a support assembly attached to the brush holder which supports the junction connecting the brush pigtail and the stator lead, said assembly having a first insulator which electrically isolates the junction from the brush holder and a second insulator which electrically isolates the pigtail from the brush holder.

6. The electric motor of claimn 5, wherein the support assembly is mounted on a flange attached to the brush holder.

7. The electric motor of claim 6, wherein the first insulator is interposed between the junction and the flange.

8. A dynamoelectric machine, which comprises:
an outer housing;
a rotatable shaft within the housing;
a stator attached to the housing;
an armature attached to the shaft;
a commutator mounted on the shaft and connected to the armature;
an electrically conductive brush holder attached to the housing;
a brush supported in the brush holder;
a brush pigtail electrically connected to the brush;
a stator lead connected to the stator and adaptable for connection to the brush pigtail at a junction; and
a support assembly attached to the housing which supports the junction connecting the brush pigtail and the stator lead, said assembly having a conductive portion and having a first insulator interposed between the junction and the conductive portion which electrically isolates the junction from the brush holder and a second insulator which electrically isolates the pigtail from the conductive portion.

* * * * *

UNITED STATES PATENT AND TRADEMARK OFFICE
CERTIFICATE OF CORRECTION

PATENT NO. : 4,166,968
DATED : September 4, 1979
INVENTOR(S) : Robert N. Prittie It is certified that error appears in the above-identified patent and that said Letters Patent are hereby corrected as shown below:

Column 4, line 66 (Claim 6, line 1) change "electric motor" to --dynamoelectric machine--; change "claimn" to --claim--.

Signed and Sealed this

Fourth Day of December 1979

[SEAL]

Attest:

SIDNEY A. DIAMOND

Attesting Officer

Commissioner of Patents and Trademarks

REEXAMINATION CERTIFICATE (968th)
United States Patent [19]

Prittie

[11] B1 4,166,968

[45] Certificate Issued  Dec. 20, 1988

[54] ELECTRICALLY ISOLATED BRUSH HOLDER

[75] Inventor: Robert N. Prittie, Aurora, Ohio

[73] Assignee: Lear Siegler, Inc., Santa Monica, Calif.

Reexamination Request:
No. 90/001,246, May 26, 1987

Reexamination Certificate for:
Patent No.: 4,166,968
Issued: Sep. 4, 1979
Appl. No.: 815,504
Filed: Jul. 14, 1977

Certificate of Correction issued Dec. 4, 1979.

[51] Int. Cl.⁴ ............................................. H02K 13/00
[52] U.S. Cl. ..................................................... 310/239
[58] Field of Search ................ 310/239, 240, 241, 242, 310/244, 245, 246, 247, 220, 221, 222, 223, 71, 43, 45, 248, 249, 238

[56] References Cited
U.S. PATENT DOCUMENTS 1,488,575  4/1924  Wagner .
3,127,533  3/1964  Gardner .

FOREIGN PATENT DOCUMENTS 1311294  10/1962  France .
1535125   6/1968  France .
27-417    1/1952  Japan .
49-15125  4/1974  Japan .
27205    of 1911  United Kingdom .
440030   12/1935  United Kingdom .
590770    7/1947  United Kingdom .
712465    7/1954  United Kingdom .
754933    8/1956  United Kingdom .
1227791   4/1971  United Kingdom .

*Primary Examiner*—R. Skudy

[57] ABSTRACT

An improvement in dynamo electric machines is disclosed in which the brush holder is electrically isolated from the brush pigtail terminal junction. The member which supports the junction connecting the brush pigtail and the lead from the stator includes an insulator which electrically isolates the junction from the brush holder. The insulator eliminates the relatively low impedance electrical path between the brush terminal and the commutator through the brush holder, preventing damaging arcing between the commutator and the brush holders.

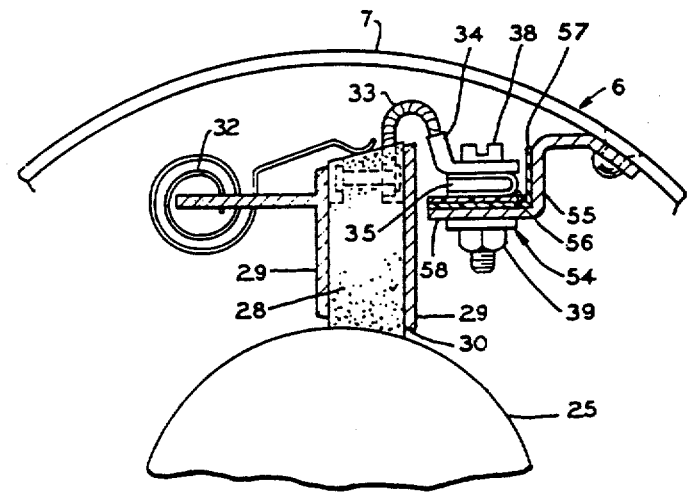

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 5 and 8 are cancelled.

Claims 2 and 6 are determined to be patentable as amended.

Claims 3 and 7, dependent on an amended claim, are determined to be patentable.

2. [The improvement of claim 1,] *An improved dynamoelectric machine of the type having a housing, a rotatable commutator within the housing, a brush which contacts the commutator, an electrically conductive brush holder attached to the housing and supporting the brush, a brush pigtail connected to the brush, and a lead for connection with the pigtail at a junction, wherein the improvement comprises an assembly attached to the brush holder which supports the junction between the brush pigtail and the lead of a stator,* [wherein] the support assembly [is] *being* mounted on a flange attached to the brush holder, *the support assembly including a first insulator which electrically isolates the junction from the brush holder and a second insulator which electrically isolates the pigtail from the brush holder.*

6. [The electric motor of claim 5], *A* dynamoelectric machine which comprises:
   *an outer housing;*
   *a rotatable shaft within the housing;*
   *a stator attached to the housing;*
   *an armature attached to the shaft;*
   *a commutator mounted on the shaft and connected to the armature;*
   *a conductive brush holder attached to the housing;*
   *a brush supported in the brush holder;*
   *a brush pigtail electrically connected to the brush;*
   *a stator lead connected to the stator and adaptable for connection to the brush pigtail at a junction; and*
   *a support assembly attached to the brush holder which supports the junction connecting the brush pigtail and the stator lead,* [wherein] the support assembly [is] *being* mounted on a flange attached to the brush holder, *said assembly having a first insulator which electrically isolates the junction from the brush holder and a second insulator which electrically isolates the pigtail from the brush holder.*

* * * * *